(12) United States Patent
Vasudeva

(10) Patent No.: US 7,191,086 B1
(45) Date of Patent: Mar. 13, 2007

(54) SYSTEM FOR VERIFYING MEDIA VIDEO DECODING CAPABILITY OF A SOFTWARE MODEL

(75) Inventor: Harish Vasudeva, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 206 days.

(21) Appl. No.: 11/029,088

(22) Filed: Jan. 4, 2005

(51) Int. Cl.
*G06F 11/00* (2006.01)

(52) U.S. Cl. .......................... 702/119; 702/123; 703/22

(58) Field of Classification Search ........ 702/117–119, 702/123
See application file for complete search history.

(56) References Cited

U.S. PATENT DOCUMENTS

| | | | | |
|---|---|---|---|---|
| 5,818,967 | A | 10/1998 | Bhattacharjee et al. | 382/233 |
| 5,883,640 | A * | 3/1999 | Hsieh et al. | 345/503 |
| 6,819,327 | B2 * | 11/2004 | Wasserman et al. | 345/581 |
| 6,873,330 | B2 * | 3/2005 | Burk et al. | 345/503 |
| 7,096,271 | B1 * | 8/2006 | Omoigui et al. | 709/231 |

OTHER PUBLICATIONS

Juurlink et al., "Implementation and evaluation of the Complex Streamed Instruction set", Sep. 8-12, 2001, IEEE, 2001 International Conference on Parallel Architectures and Compilation Techniques, 2001, pp. 73-82.*

* cited by examiner

*Primary Examiner*—Hal Wachsman
(74) *Attorney, Agent, or Firm*—Hamilton & Terrile, LLP; Stephen A. Terrile

(57) ABSTRACT

A method for verifying operation of a media acceleration engine. The method includes providing input data to a replica of a media acceleration engine wherein the input data including a complete set of media streams, processing the input data via the replica of the media acceleration engine to provide replica output data, providing a subset of the complete set of media streams to a design of the media acceleration engine, simulating the operation of the design of the media acceleration engine using the subset of the complete set of media streams to provide design output data, comparing the replica output data with respective design output data, and verifying the operation of the media acceleration engine when replica output data matches corresponding design output data.

19 Claims, 5 Drawing Sheets

US 7,191,086 B1

SYSTEM FOR VERIFYING MEDIA VIDEO DECODING CAPABILITY OF A SOFTWARE MODEL

BACKGROUND OF THE INVENTION

1. Field of the Invention

The present invention relates to media accelerators and more particularly to verifying media video decoding capability of a software model of a media accelerator.

2. Description of the Related Art

It is known to provide a computer system with a media accelerator for decoding and processing video data. Video data may conform to video standards such as, for example, the windows media video version 9 (WMV9) standard.

When designing a media accelerator, it desirable to validate the video decoding functionality of a media accelerator. For example, to provide a media accelerator that is compliant with the WMV9 standard, it is necessary for the media accelerator design to be verified using a plurality of video streams that are then decoded using the media accelerator design. In this way, a media accelerator may be said to be compliant with a particular video standard.

SUMMARY OF THE INVENTION

In accordance with the present invention, a method is set forth for verifying that a media accelerator design conforms to a particular video standard is set forth. More specifically, the method includes providing a software model of a media accelerator that mimics the media accelerator design and then using this software model to verify and validate a decoding capability of a media accelerator design by providing video streams to the software model, decoding the video streams using the software model, comparing the results of the decoding with a known good output decoded stream and then selectively using the hardware design to decode some of the video steams and then comparing the results of the hardware decoded streams with the results of the software decoded streams.

In one embodiment, the invention relates to a method for verifying operation of a media acceleration engine which includes providing input data to a replica of a media acceleration engine wherein the input data including a complete set of media streams, processing the input data via the replica of the media acceleration engine to provide replica output data, providing a subset of the complete set of media streams to a design of the media acceleration engine, simulating the operation of the design of the media acceleration engine using the subset of the complete set of media streams to provide design output data, comparing the replica output data with respective design output data, and verifying the operation of the media acceleration engine when replica output data matches corresponding design output data.

In another embodiment, the invention relates to an apparatus for verifying operation of a media acceleration engine which includes a replica of a media acceleration engine, means for providing input data to the replica of a media acceleration engine wherein the input data including a complete set of media streams, means for processing the input data via the replica of the media acceleration engine to provide replica output data, means for providing a subset of the complete set of media streams to a design of the media acceleration engine, means for simulating the operation of the design of the media acceleration engine using the subset of the complete set of media streams to provide design output data, means for comparing the replica output data with respective design output data, and means for verifying the operation of the media acceleration engine when replica output data matches corresponding design output data.

In another embodiment, the invention relates to a system for verifying operation of a replica of a media acceleration engine against a set of reference code. The system includes a replica of a media accelerator engine, an analysis module wherein the analysis module providing input data to the replica of the media acceleration engine, the input data including a complete set of media streams, the replica of the media accelerator engine processing the input data to provide replica output data, the analysis module providing input data to the set of reference code, the set of reference code providing reference code output data, and, the analysis module comparing the replica output data with the reference code output data to verify operation of the replica.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
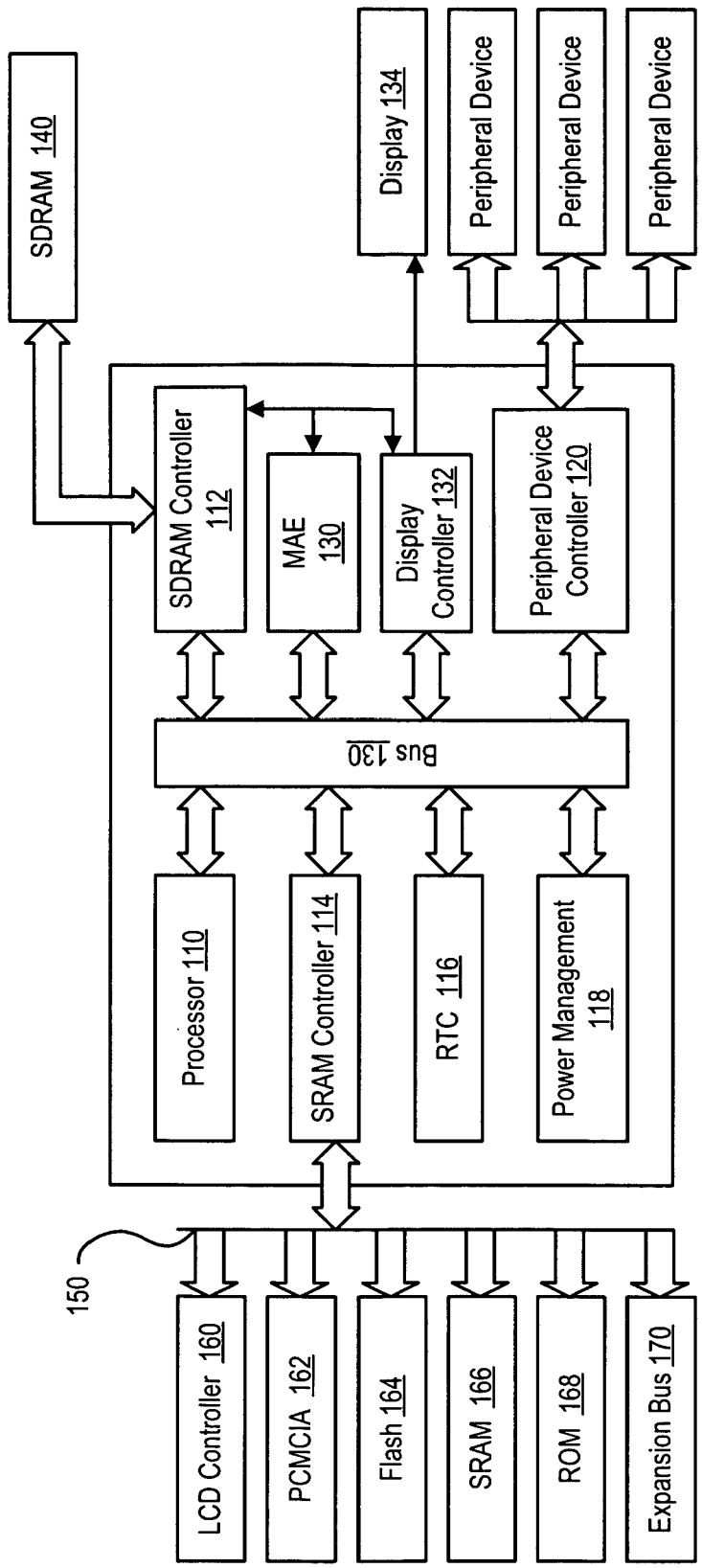
FIG. 1 shows a schematic block diagram of a system which includes a media acceleration engine.

Referring to FIG. 1, system 100 designed for use in mobile information appliances. System 100 is preferably a complete system on a chip (SOC) based on a MIPS32 instruction set. The system 100 is designed to operate at low power.

System 100 includes a processor 110, a synchronous dynamic random access memory (SDRAM) controller 112, a static random access memory (SRAM) controller 114, a real time clock 116, a power management module 118 and a peripheral device control module 120 all interconnected via bus 130.

The peripheral device control module 120 may be coupled to one or more peripheral devices such as an Ethernet media access control (MAC) controller, a universal serial bus (USB) device and host controller, a universal asynchronous receiver transmitter (UART) controller, an Infrared Data Association (IrDA) controller, an audio code '97 (AC'97) controller, and a secure digital (SD) controller.

System 100 also includes a media accelerator engine (MAE) 120 as well as an LCD controller 132. The media accelerator engine 120 and the display controller 132 are coupled to the SDRAM controller 112. The display controller 132 may also be coupled to a display device 134.

SDRAM controller 112 is coupled to SDRAM 140. SRAM controller 114 is coupled to a static bus 150. The static bus 150 is a general purpose bus which includes a 32-bit address path, a 32-bit data bus, a plurality of control signal paths, including a plurality of general purpose I/O signal paths. Some or all of the control signal paths and the general purpose I/O signal paths may be used depending on the type of device with which the SDRAM controller 114 is communicating.

Static bus 150 is also coupled to one or more static bus devices such as, e.g., an LCD controller 160, a personal computer memory card international association (PCMCIA) device 162, a flash memory device 164, SRAM 166, read only memory (ROM) 168 and an expansion bus 170. Static bus 150 is also coupled to a DMA acknowledge control circuit 180. The DMA acknowledge control circuit 180 is in turn coupled to an IDE connector 182 to which an IDE disk drive 183 may be connected. The SRAM controller 114 functions as a general purpose bus controller and may communicate with any one of a plurality of static bus devices. For example, when SRAM controller 114 is communicating with the SRAM 166, then SRAM controller 114 functions as an SRAM controller. When SRAM controller 114 is communicating with a PCMCIA device 162, then the SRAM controller 114 functions as a PCMCIA controller.

The static bus 150 may interface with Integrated Drive Electronics (IDE) hard drives via a modified PCMCIA interface. Such an interface eliminates the need for an external disk drive controller. The static bus 150 interfaces with IDE drives via the DMA acknowledge control circuit 180. The DMA acknowledge control circuit 180 provides a direct interface with an IDE drive when accessing the IDE drive in PIO mode. The DMA acknowledge control circuit 180 enables a circuit which is not designed for DMA access to IDE to perform a DMA data transfer to IDE. The DMA transfer mode is a master transfer mode: The DMA transfer is initiated by the processor 110. When communicating with the IDE drive in a PIO mode, the interface is directly between the SRAM controller 114 and the IDE drive 183; there is no need for the DMA acknowledge signal to be generated.

Figure 2:
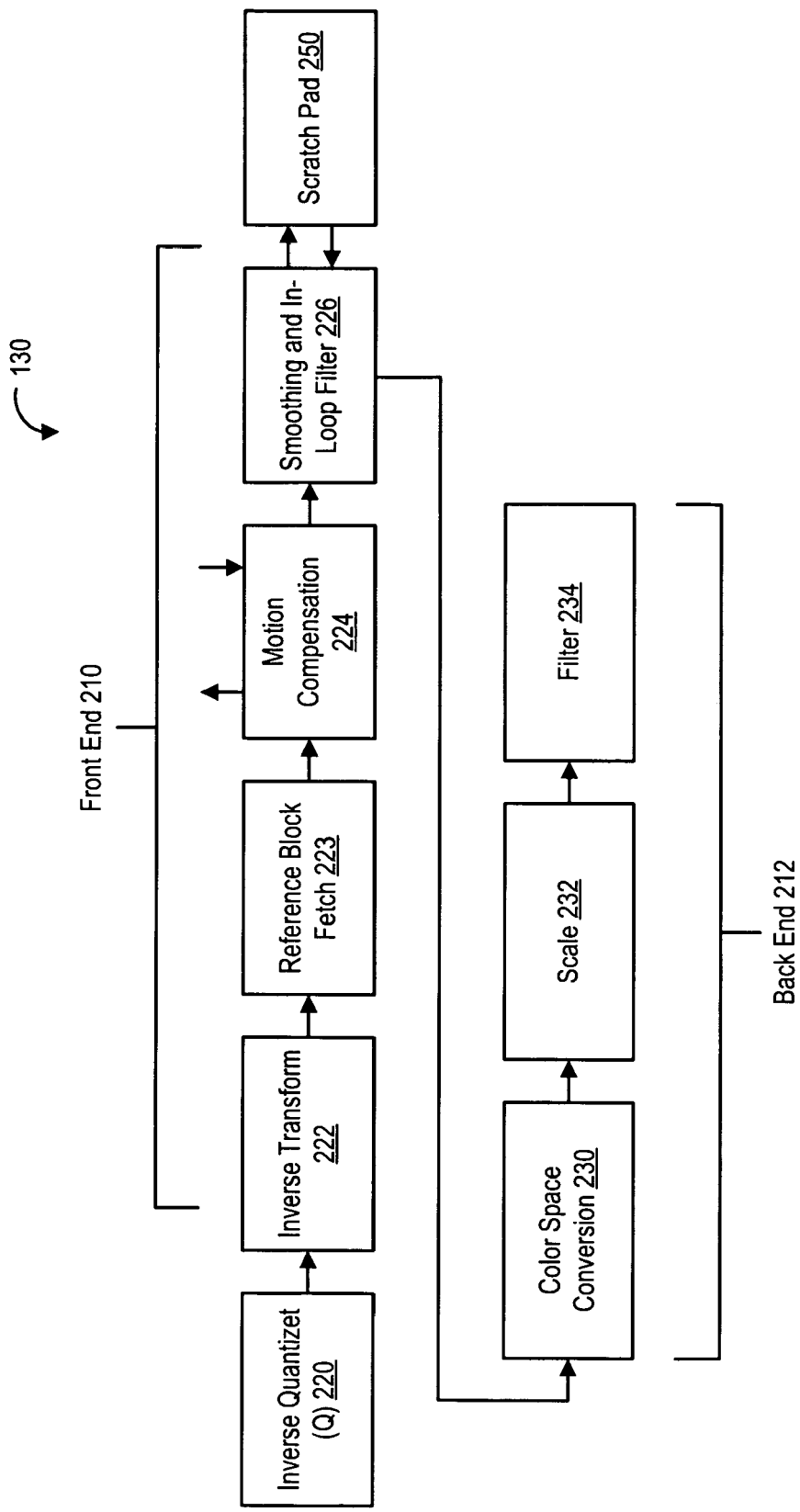
FIG. 2 shows a schematic block diagram of a media acceleration engine.

Referring to FIG. 2, a schematic block diagram of a media acceleration engine 130 is shown. The media acceleration engine 130 includes a front end 210 and a back end 212. The front end 210 includes an inverse quantize module 220, and inverse transform module 222, a reference block fetch module 223, a motion compensation module 224 and a smoothing and in-loop filter module 226. The back end 212 includes a color space conversion module 230, a scaling module 232 and a filter module 234. The media acceleration engine 130 also includes a scratch pad 250 with which the smoothing and in-loop filter module 226 interacts.

The inverse quantize module 220 provides an inverse quantization (IQ) function. The inverse transform module 222 provides an inverse discrete cosine transform (IDCT) function. The motion compensation module 224 provides interframe, predicted and bidirectional motion compensation function. The motion compensation function includes support for 1, 2 and 4 motion vectors, support for field prediction and ful pel, half pel and quarter pel motion compensation. The smoothing and in-loop filter module 226 provides WMV9 an overlap smoothing and an in-loop filter function.

The color space conversion module 230 provides scaler support for various input and output modes as well as programmable coefficient data. The scaling module 232 provides a plurality of scaling functions including a reduced bandwidth operating mode. The filter module 234 enables independent horizontal and vertical filtering.

Figure 3:
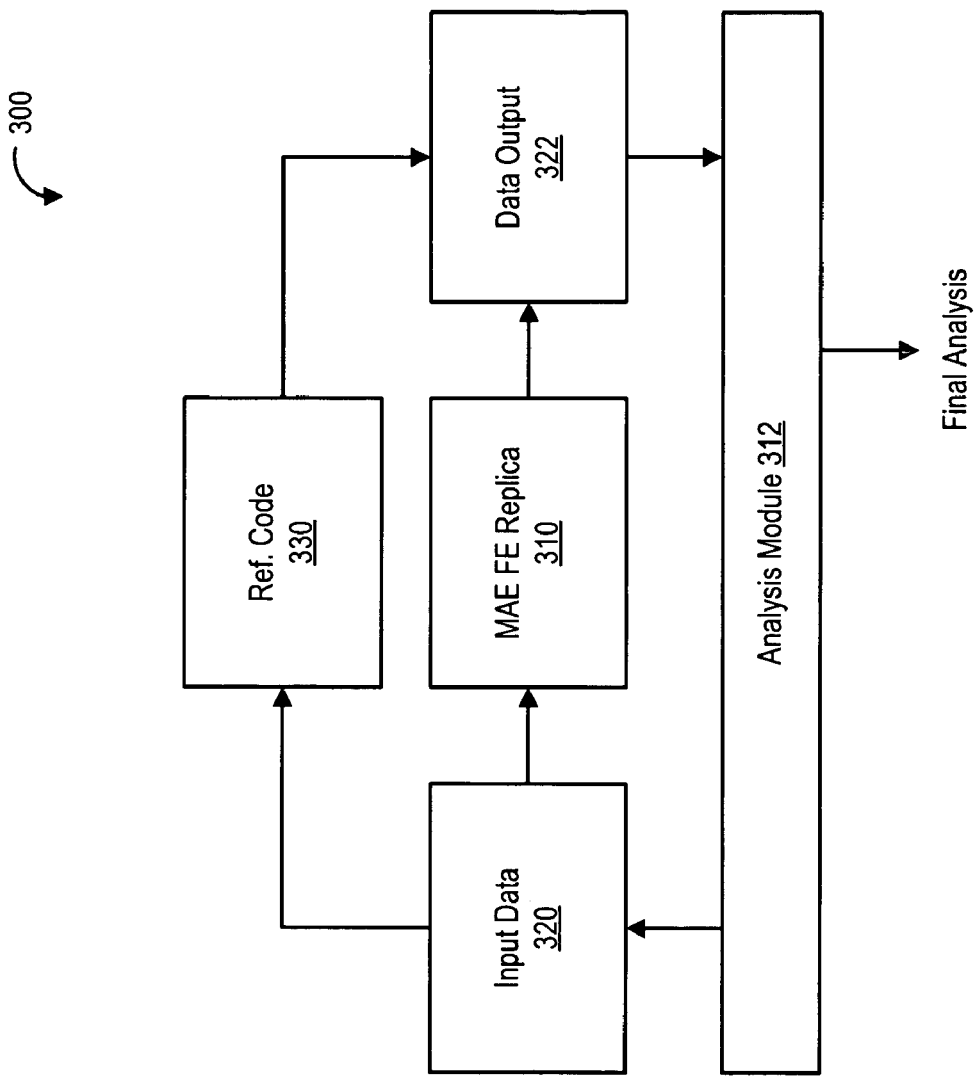
FIG. 3 shows a block diagram of a system for verifying the decoding capability of a media accelerator engine.

FIG. 3 shows a block diagram of a system 300 for verifying the decoding capability of a media accelerator engine. The system includes a MAE front end replica 310 as well as an analysis module 312. The MAE front end replica 310 receives input data 320 from the analysis module 312 and generates a data output 322 that is provided back to the analysis module 312. The system 300 also includes a set of reference code 330. The set of reference code provides a known good decoding capability. The set of reference code 330 also receives input data 320 from the analysis module 312 and provides known good data output 322 to the analysis module.

The MAE front end replica 310 is a software model of the front end of the media accelerator engine 130. The software model is developed to mimic every function of the media accelerator engine design. The software model is designed to process the input data 320 faster than an actual front end design as instantiated in a design language such as a verilog design. In one embodiment, the software model is comprised of C code.

Thus, the software model can receive a relatively large number of streams (e.g., 757 different certifiable streams) and process these streams to provide data output for each of these streams. Each of the processed streams is then provided to the analysis module 312 so that each of the streams may be verified to function with the front end design.

Figure 4:
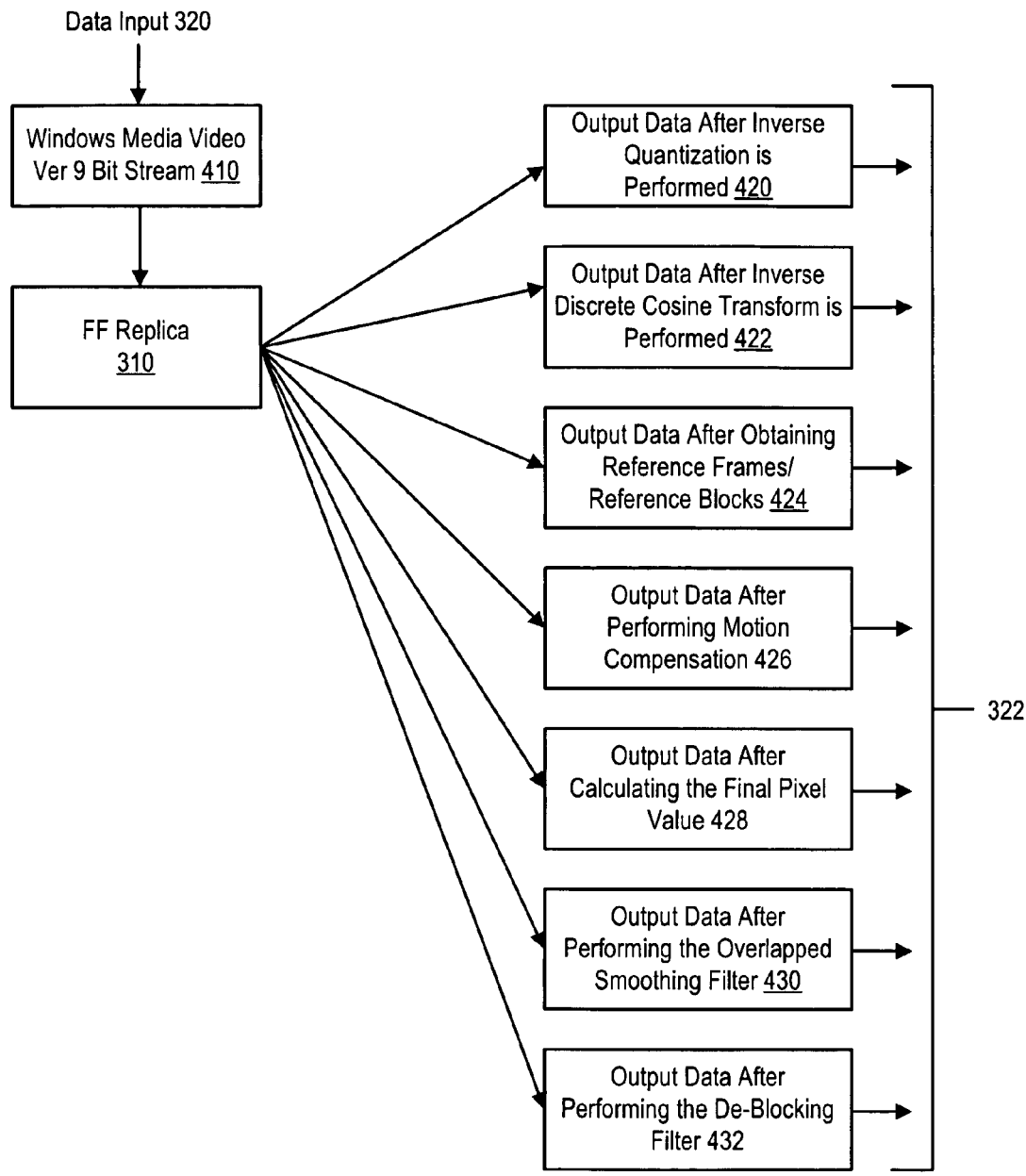
FIG. 4 shows a flow chart of the operation of the front end replica of the system for verifying the decoding capability of a media accelerator.

Referring to FIG. 4, a flow chart of the operation of the front end replica 310 of the system for verifying the decoding capability of a media accelerator is shown. More specifically, the input data 320 (e.g., a windows media video version 9 bit stream 410) is provided to the front end replica 410 which is developed using a stream porting kit 412 (e.g., a windows media porting kit code base provided by Microsoft).

The front end replica 310 then provides a plurality of data outputs. More specifically, the front end replica 310 provides data after an inverse quantization function is performed at step 420, the front end replica 310 provides data after an inverse discrete cosine function is performed at step 422. The front end replica provides data after obtaining reference frames and reference blocks at step 424. The front end replica 130 provides data after performing a motion compensation function at step 426. The front end replica 130 provides data after calculating a final pixel value at step 428. The front end replica 130 then provides data after performing an overlapped smoothing filter function at step 430. The front end replica 130 then provides data after performing a de-blocking filter function at step 430.

Figure 5:
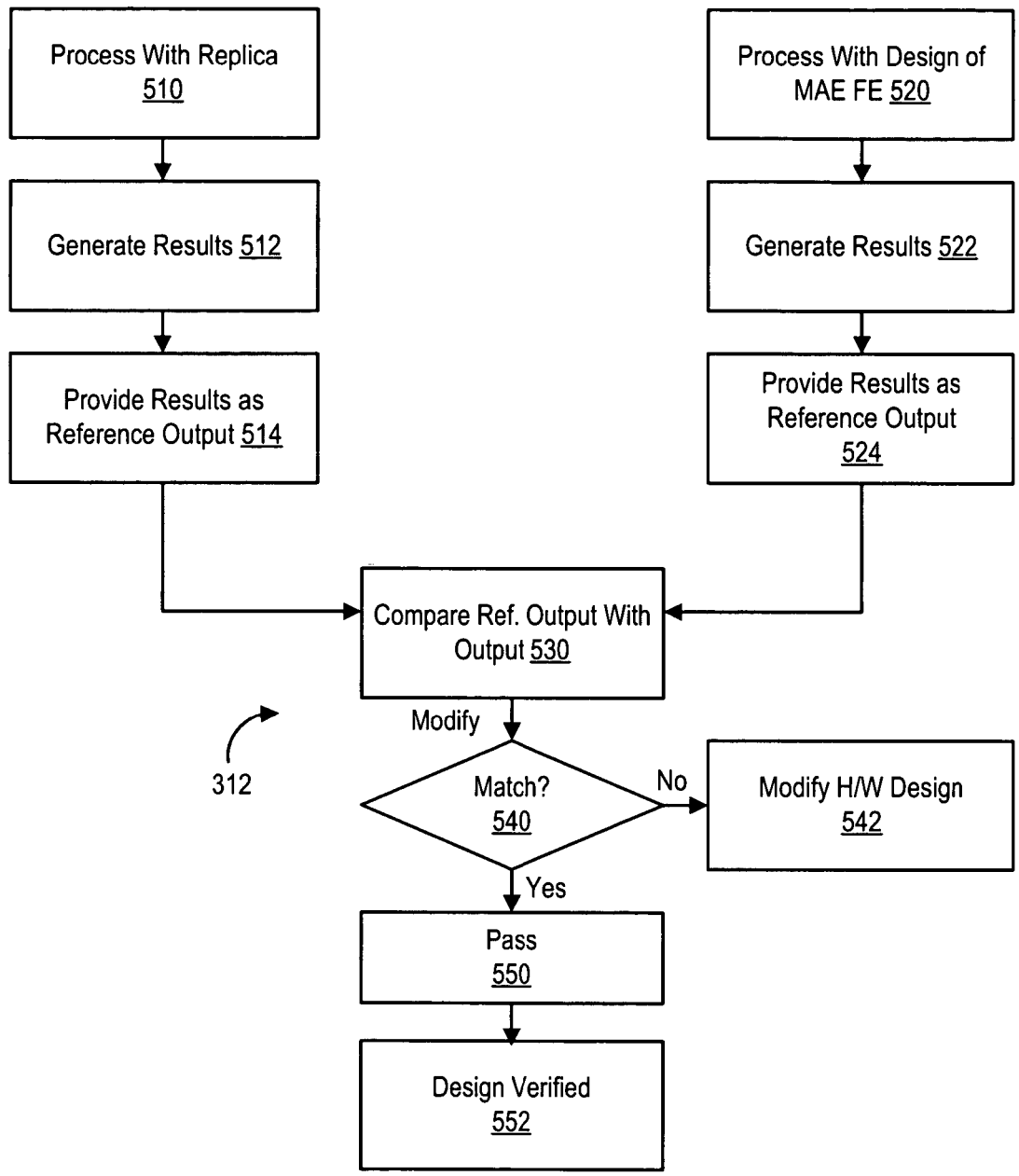
FIG. 5 shows a flow chart of the operation of the system analysis module of the system for verifying the decoding capability of a media accelerator engine.

FIG. 5 shows a flow chart of the operation of the system for verifying the decoding capability of a media accelerator engine. More specifically, the system 300 processes a complete set of media streams (i.e., all of the media streams necessary to verify a media accelerator design) via the replica 310 at step 510. The replica 310 generates the test results at step 512 and provides these results to the analysis module 310 at step 514.

The system also simulates the operation of a hardware design of the media accelerator for a subset of the complete set of media streams at step 520. The design of the media accelerator generates the results of the simulation at step 522 and provides these results to the analysis module 310 at step 524.

The analysis module 312 compares the output of the replica (i.e., the known good reference output) with the output data provided by the hardware design at step 530 for the streams that were processed by the hardware design. The analysis module 312 determines whether the known good reference output matches the output data provided by the hardware design at step 540. If there is not a match, then the hardware design is modified at step 542 and media streams are simulated with the modified hardware design. If there is a match, then the hardware design passes at step 550 and the design is verified at step 552.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while a particular processor architecture and media acceleration engine architecture is set forth, it will be appreciated that variations within the processor architecture and media acceleration engine architecture are within the scope of the present invention.

Also for example, the above-discussed embodiments include modules and units that perform certain tasks. The modules and units discussed herein may include hardware modules or software modules. The hardware modules may be implemented within custom circuitry or via some form of programmable logic device. The software modules may include script, batch, or other executable files. The modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules and units is for illustrative purposes. Alternative embodiments may merge the functionality of multiple modules or units into a single module or unit or may impose an alternate decomposition of functionality of modules or units. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for verifying operation of a media acceleration engine comprising:
   providing input data to a replica of a media acceleration engine, the input data including a complete set of media streams;
   processing the input data via the replica of the media acceleration engine to provide replica output data; and,
   providing a subset of the complete set of media streams to a design of the media acceleration engine;
   simulating the operation of the design of the media acceleration engine using the subset of the complete set of media streams to provide design output data;
   comparing the replica output data with the design output data; and,
   verifying the operation of the media acceleration engine when the replica output data matches the design output data;
   providing results of the verifying to indicate whether the media acceleration engine conforms to a media standard.

2. The method of claim 1 wherein:
   the complete set of media streams includes all media streams required to verify operation of a media acceleration engine as conforming to a windows media video standard.

3. The method of claim 1 wherein:
   the processing the input data includes performing an inverse quantization function on the input data.

4. The method of claim 1 wherein:
   the processing the input data includes performing an inverse cosine transform on the input data.

5. The method of claim 1 wherein:
   the processing the input data includes obtaining reference frames and reference blocks on the input data.

6. The method of claim 1 wherein:
   the processing the input data includes performing a motion compensation function on the input data.

7. The method of claim 1 wherein:
   the processing the input data includes calculating a pixel value on the input data.

8. The method of claim 1 wherein:
   the processing the complete set of media streams includes performing an overlapped smoothing filter function on the input data.

9. The method of claim 1 wherein:
   the processing the input data includes performing a de-blocking filter function on the input data.

10. An apparatus for verifying operation of a media acceleration engine comprising:
    a replica of a media acceleration engine;
    means for providing input data to the replica of a media acceleration engine, the input data including a complete set of media streams;
    means for processing the input data via the replica of the media acceleration engine to provide replica output data;
    means for providing a subset of the complete set of media streams to a design of the media acceleration engine;
    means for simulating the operation of the design of the media acceleration engine using the subset of the complete set of media streams to provide design output data;
    means for comparing the replica output data with the design output data; and,
    means for verifying the proper operation of the media acceleration engine when replica output data matches the design output data; and,
    means for providing results of the verifying to indicate whether the media acceleration engine conforms to a media standard.

11. The apparatus of claim 10 wherein:
    the complete set of media streams includes all media streams required to verify operation of a media acceleration engine as conforming to a windows media video standard.

12. The apparatus of claim 10 wherein:
    processing the input data includes performing an inverse quantization function on the input data.

13. The apparatus of claim 10 wherein:
    processing the input data includes performing an inverse cosine transform on the input data.

14. The apparatus of claim 10 wherein:
processing the input data includes obtaining reference frames and reference blocks on the input data.

15. The apparatus of claim 10 wherein:
processing the input data includes performing a motion compensation function on the input data.

16. The apparatus of claim 10 wherein:
processing the input data includes calculating a final pixel value on the input data.

17. The apparatus of claim 10 wherein:
processing the input data includes performing an overlapped smoothing filter function on the input data.

18. The apparatus of claim 10 wherein:
processing the input data includes performing a de-blocking filter function on the input data.

19. A system for verifying operation of a replica of a media acceleration engine against a set of reference code for a media standard, the system comprising:
a replica of a media accelerator engine;
an analysis module,
the analysis module providing input data to the replica of the media acceleration engine, the input data including a complete set of media streams, the replica of the media accelerator engine processing the input data to provide replica output data,
the analysis module providing input data to the set of reference code for a media standard, the set of reference code providing reference code output data, and,
the analysis module comparing the replica output data with the reference code output data to verify proper operation of the replica and providing results of the verifying to indicate whether the media acceleration engine conforms to the media standard.

* * * * *